United States Patent Office 3,539,378
Patented Nov. 10, 1970

3,539,378
SYNTHETIC FILM MATERIALS
Basil Robert Shephard, Margaret Loudon Clachan, David Rankine Kennedy, and Richard G. Turner, Brantham, Manningtree, Essex, England, assignors to Bexford Limited, Brantham, Manningtree, Essex, England, a company of Great Britain
No Drawing. Continuation-in-part of application Ser. No. 511,352, Dec. 3, 1965. This application Sept. 30, 1968, Ser. No. 763,964
Claims priority, application Great Britain, Dec. 4, 1964, 49,429/64
Int. Cl. B44d 1/092, 1/52
U.S. Cl. 117—47
10 Claims

ABSTRACT OF THE DISCLOSURE

Translucent drafting films are produced by treating a film of synthetic linear polyester material with a 0.5–20% by weight solution in a volatile medium of a halogen-containing phenolic material, for 1–15 minutes at 30–120° C. and superimposing on the treated surface of the film at least one adherent layer of a hydrophobic organic film forming material, the outermost layer containing finely divided discrete particles of a translucence-producing toothing agent.

CROSS-REFERENCE TO RELATED APPLICATIONS

This application is a continuation-in-part of our application Ser. No. 511,352, filed Dec. 3, 1965.

This invention relates to synthetic film materials and more particularly to flexible translucent coated films for drafting purposes.

It is known that self supporting films of synthetic linear polyesters, particularly polyethylene terephthalate, may readily be prepared with mechanical, physical and chemical properties which make them very suitable as base materials for the production of translucent coated film for use in drawing offices, for tracing or photographic reproduction purposes.

To adapt a self supporting polyester film for the purpose mentioned it is known to provide it with a coating of a resinous composition containing inorganic toothing agents and so produce a surface, which is suitable for writing on with ink or pencil, or which can subsequently be prepared in such a way that it can be coated with a photographic emulsion or will accept a solution containing a light sensitive diazonium salt.

However there is a great difficulty in providing adequate anchorage of such coatings to the film base and they have been found to separate from the base in use. If the coating is hard there is a tendency for it to separate when the product is folded or flexed; if the coating is soft or flexible it may separate locally under the influence of a writing implement such as a sharp pointed pencil.

It has been suggested to overcome this difficulty by applying to the synthetic linear polyester film base an intermediate coating or coatings of an adherent polymeric material before applying the coating composition containing translucence-producing toothing agents, but the number of materials having suitably tenacious adhesion to the base is very limited and at best there is a tendency for the solvents of the coating composition containing translucence-producing toothing agents to loosen such intermediate coatings from the film base.

Various treatments of synthetic linear polyesters have been tried to improve the adherence to them of various organic coatings. These include treatments with compounds which have a swelling or solvent action on the synthetic linear polyester.

However not all of the many compounds which have a swelling or solvent action on synthetic linear polyester are effective in achieving satisfactory bonding or organic coatings to synthetic linear polyester films. Those which substantially improve the adherence of coatings are generally inconvenient in use—for example the halogenated fatty acids which have been proposed in conection with the production of drafting films have the disadvantage of corroding the materials with which plastic film coating plant is generally constructed.

Thus the various methods hitherto tried of achieving the bonding of the resinous compositions containing translucence producing and toothing agents to synthetic linear polyester films, during the manufacture of coated products for use in drawing offices, have not proved entirely satisfactory.

It is an object of the present invention to provide a new coated synthetic linear polyester film suitable for use in drawing offices for tracing or photographic reproduction purposes, in which the aforementioned tendency of the coating to separate from the base is substantially eliminated.

According to the present invention there is provided a process for the production of a translucent polyester film material which is respective to clear and legible marking with pencil or ink, which comprises treating a film of synthetic linear polyester on at least one surface with a solution or dispersion in a volatile medium of one or more halogen-containing phenolic substances, under such conditons as to leave the surface of the polyester film in its normally lustrous condition, and superimposing on the treated surface an adherent layer or layers of hydrophobic organic film-forming material, the single layer, or outermost layer where more than one is applied, containing finely divided discrete particles of a translucence-producing toothing agent or agents. The invention further includes drafting films made by the said process.

For the purpose of this invention the term "halogen containing phenolic substance" is intended to comprise chemical compounds whose molecules contain at least one benzenoid ring or fused benzenoid ring, and one or more hydroxyl groups and one or more halogen atoms which are attached directly to carbon atoms belonging to a benzenoid or fused benzenoid ring or rings.

Preferably the halogen-containing phenolic substances employed in the process of the invention are compounds comprising chlorinated and brominated phenols optionally substituted with methyl or carboxylic acid groups, and chlorinated and brominated naphthalene, diphenyl and diphenyl alkanes substituted with at least one hydroxy group.

The preferred halogen-containing phenolic substances are those represented by the formula:

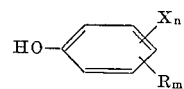

where X is Cl or Br, $n$ is an integer from 1–5, R is H, $CH_3$, COOH,

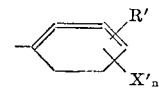

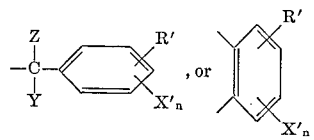

where R′ is H or OH, X′ is H, Cl, or Br, and Y and Z may be H, $CH_3$ or $C_2H_5$ and $m$ is an integer from 1–4.

The following are examples of such halogen containtaing phenolic substances; ortho-chlorophenol; parachlorophenol; 2,4-dichlorophenol; 2,4,5-trichlorophenol; 2,4,6-trichlorophenol; 2,3,4,6-tetrachlorophenol; pentachlorophenol; 2,4-dichloro-5-methyl-phenol; 2,4-dichloro-3,5-dimethyl-phenol; 4-chloro-2-phenyl phenol; 2-benzyl-4-chlorophenol; 2,2'-dichloro-4,4'-diphenol; 2,2'-methylene bis (4-chlorophenol) 4-chloro-1-napthol; 3,5 dichlorosalicyclic acid; 2,4-dibromo-phenol, 2,4,6-tribromo-phenol; isopropylene di (2,5 dichlorophenol); o-bromophenol; m-chlorophenol; 4-chloro-3-methyl phenol; 5-chloro-3,6-dimethyl phenol; 2,4 dichloro-3-methyl phenol; 5-chloro-2-hydroxy diphenyl; and 6,7 dichloro-1-napthol.

A halogen-containing phenolic substance of especially good characteristics for use in the present invention is 4-chloro-3-methylphenol.

The film if synthetic linear polyester is preferably a film formed from polyethylene terephthalate and it is preferably one which has been molecularly orientated by stretching in one or two directions at right angles. Such synthetic linear polyester film materials are readily available commercially.

The treatment may conveniently consist of applying to the synthetic linear polyester film surface a solution of any one or several of the exemplified halogen containing phenolic substances in suitable volatile media, such as those containing lower ketones, lower alcohols or chlorinated hydro-carbons, or dilute solutions of volatile bases such as dilute ammonia, by using any of several well known coating procedures, such as dip or bead application, and then heating the film for a short time at an elevated temperature to remove the volatile solvents and allow the halogen containing phenolic substance to swell the film surface to some extent.

It is generally preferred to treat the synthetic linear polyester film base by coating it with a solution of 4-chloro-3-methylphenol, or with 2,4,6 trichlorophenol, 2,4,5 trichlorophenol or 2,4 dichlorophenol or a binary mixture of these substances, in suitable volatile solvents, these substances or binary mixtures constituting 0.5–20% by weight of the treating solution, and then to heat the film for 1–15 mins. at 30–120° C.

Many compositions are suitable for application as the outermost layer which is essentially a hydrophobic film forming material containing finely divided discrete particles of a translucence producing toothing agent or agents. Usual such toothing agents are inorganic substances.

For example in such compositions the hydrophobic organic film forming material may be one or more of the following: a cellulose ester or ether, an acrylic polymer or copolymer, a urea formaldehyde resin or modified urea formaldehyde resin, a melamine formaldehyde resin or modified melamine formaldehyde resin, an alkyd resin, a polyvinyl acetal, a curable epoxy resin, a soluble polyamide resin, a polyester resin.

Finely divided inorganic translucence producing and toothing agents included in such compositions may be selected from silica, silicates, ground glass, chalk, talc, diatomaceous earth, magnesium carbonate, zinc oxide and titanium oxide. Finely divided silica of particle size 0.1–15 microns is the preferred toothing agent, together with which smaller quantities of the other materials may be incorporated to obtain the required degree of translucency and to increase the toughness and marresistance of the coating.

These compositions may be applied from volatile solvent media by well known coating methods such as dip coating, bead coating and reverse roll coating, and the applied layer then dried. It is preferred that the film coated in this way should be baked for a short period at temperatures around 100–120° C. to effect cure of partially polymerised constituents.

Translucence producing and toothing compositions as described above may be applied directly to a polyester film surface which has been treated in the manner already described herein, but it should be understood that the invention embraces alternative forms wherein one or more other layers, referred to as intermediate layers, are applied first to the treated polyester film surface before a translucence producing or toothing composition is superimposed thereon.

Suitable intermediate layers include those layers which already have been proposed in connection with the coating of untreated synthetic linear polyester films for the production of coated drafting film products. For example a polyester surface treated as herein described may be coated first with an adherent layer consisting essentially of one of the following:

(1) A mixed terephthalate-isophthalate polyester or a polyesteramide or a polyester oxazoline.
(2) A polyvinyl halogeno acetate or a copolymer of a vinyl halogeno acetate.
(3) A chlorinated polyalkyl acrylate or a polyalkyl alkylmethacrylate or a chlorinated copolymer of alkyl acrylates and/or alkylmethacrylates.
(4) A curable epoxy resin.

before the translucence producing and toothing composition is superimposed thereon. Other suitable intermediate layers are those which contain as an essential constituent a hydrophobic organic film forming material which is a major constituent of the subsequently applied translucence producing and toothing composition.

Interlayers which are particularly suitable for the subsequent application of translucence producing toothing compositions based on a cellulose ester or a polyvinyl acetal resin, are those which contain as an essential constituent a vinylidene chloride-acrylonitrile copolymer or a vinyl chloride-vinyl acetate copolymer or a cellulose acetate-butyrate or a phenol formaldehyde resin.

The invention also embraces alternative forms wherein any of the above mentioned interlayer materials may be used in combination with any one or several of the halogen containing phenolic substances as a first treatment of the synthetic linear polyester film, to be followed by a translucence producing toothing composition applied directly onto the treated surface.

The coated synthetic linear polyester film products provided by the present invention may be further prepared in such a way that they will accept photographic silver halide emulsions or solutions containing light sensitive diazonium salts, and the final products can then be used photographically and have corrections made by removing the photographic image and drawing in pencil or ink onto the drafting surface.

The following examples will serve to illustrate the invention.

In these examples various commercial materials are used and these are as follows:

Paralac 285X, a castor oil alkyd resin.
Paralac 2001, a solution of a modified urea-formaldehyde resin.
Formvar 770, a copoly-vinyl formal containing 40–50% polyvinyl acetate and 5–6.5% polyvinyl alcohol.
Epikote 1001, an epoxy resin with epoxide equivalent 450–525 (grams of resin containing one equivalent of epoxide).
Epikote 1004, an epoxy resin with epoxide equivalent 905–985.
Versamid 100, a soluble polyamide with an amine value 83–93 (mgm. equivalent per gram of resin).
Versamid 115, a soluble polyamide with a amine value 210–220.
Casil 64, a micronised silica of particle size 6–14 microns.
Santocol 54, a silica with an average particle size 0.5 to 3.0 microns.
Runa RH20, rutile titanium oxide.
Tioxide R–CH3, modified titanium dioxide.

Flexiplas 249, a matt lacquer supplied by Swale Chemicals.

Saran F220, a vinylidene chloride-acrylonitrile compolymer.

VAGH, a partially hydrolysed vinyl chloride-vinyl acetate copolymer.

R5468/1, a novolak supplied by Bakelite Limited.

Formvar 1595E, a copoly-vinyl formal containing 9.5–13% polyvinyl acetate and 5–6.0% polyvinyl alcohol.

Aerosil TK800, an amorphous silica of primary particle size 10–30 millimicrons.

In all the formulae given in the examples, commercial materials which are supplied as solutions, such as Paralac 2001, are quoted as the appropriate quantities of solid constituents; the solvents of the supplied solutions are quoted separately.

The inorganic toothing or translucence-producing agents, Santocel 54 and Runa RH20, were generally dispersed in a concentrate with some of the lacquer constituents by ball milling or attritor milling; the resulting concentrated dispersion was incorporated in the final lacquer by stirring.

Gasil 64 and Tioxide R–CR3 were incorporated in the final lacquer by high speed stirring.

The viscosities of the lacquers which produced the pencil and ink take surface, were in the range 2 to 10 poises and were applied by a reverse roll coater, or by a device incorporating a wire wound doctor bar to give dry coating thicknesses in the range of 0.0001 to 0.0005 inch. In all these examples the film base used was biaxially orientated polyethylene terephthalate film. Because of the common factors, the examples only recite the coatings applied to the film base.

EXAMPLE 1

First coat

A solution as follows:

| | | |
|---|---|---|
| 2,4-dichlorphenol | g | 10.0 |
| Acetone | ml | 100 |

Seasoned for 2 mins. at 100° C.

Second coat

A lacquer of composition as follows:

| | G. |
|---|---|
| Cellulose nitrate (H200) | 4.5 |
| Paralac 2001 (solid) | 8.9 |
| Paralac 285X | 4.5 |
| Gasil 64 | 3.1 |
| Runa RH20 | 0.20 |
| Zinc chloride | 0.3 |
| Industrial methylated spirits | 8 |
| Methyl ethyl ketone | 40 |
| Methyl Cellosolve | 22 |
| Xylene | 9 |

Seasoned for 15 mins. at 105° C.

EXAMPLE 2

First coat

A solution as follows:

| | | |
|---|---|---|
| 2,4,5-trichlorphenol | g | 5.0 |
| Methylene chloride | ml | 100 |

Seasoned for 5 mins. at 30° C.

Second coat

A lacquer as for Example 1.

EXAMPLE 3

First coat

A solution as follows:

| | | |
|---|---|---|
| 2,4,6-trichlorphenol | g | 10.0 |
| Acetone | ml | 100 |

Seasoned for 2 mins. at 100° C.

Second coat

A lacquer as for Example 1.

EXAMPLE 4

First coat

A solution as follows:

| | | |
|---|---|---|
| 2,4-dichlorphenol | g | 1.0 |
| 2,4,6-trichlorphenol | g | 1.0 |
| Methanol | ml | 100 |

Seasoned for 90 seconds at 100° C.

Second coat

A lacquer as for Example 1.

EXAMPLE 5

First coat

A solution as follows:

| | | |
|---|---|---|
| 2,4-dibromophenol | g | 5.0 |
| Methanol | ml | 100 |

Seasoned for 2 minutes at 150° C.

Second coat

A lacquer as for Example 1.

EXAMPLE 6

First coat

A solution as follows:

| | | |
|---|---|---|
| 4-chloro-2-phenyl phenol | g | 5.0 |
| Acetone | ml | 100 |

Seasoned for 2 minutes at 110° C.

Second coat

A lacquer as for Example 1.

EXAMPLE 7

First coat

A solution as follows:

| | | |
|---|---|---|
| 2,4,6-trichlorphenol | g | 3.0 |
| 2,4-dichlorphenol | g | 2.0 |
| 0.1 N-aqueous ammonia | ml | 100 |
| Sodium lauryl sulphate | g | 0.25 |

Seasoned for 5 minutes at 100° C.

Second coat

Flexiplas 249 matt lacquer. Seasoned for 15 mins. at 120° C.

EXAMPLE 8

First coat

A solution as follows:

| | | |
|---|---|---|
| 2,4-dichlorphenol | g | 2.5 |
| 2,4,6-trichlorphenol | g | 2.5 |
| Methanol | ml | 100 |

Seasoned for 90 seconds at 80° C.

Second coat

A solution as follows:

| | | |
|---|---|---|
| Copolymer containing 60 mole percent vinyl monochloracetate and 40 mole percent vinyl alcohol | g | 1.0 |
| Acetone | ml | 100 |
| Ethyl lactate | ml | 3 |

Dried for 30 mins. at 90° C.

Third coat

A lacquer of composition as follows:

| | G. |
|---|---|
| Cellulose acetate (HAV) | 10.0 |
| Santocel 54 | 3.0 |
| Acetone | 61 |
| Ethyl lactate | 26 |

Seasoned for 15 mins. at 105° C.

A lacquer of composition as for Example 1 was alternatively applied to Coat 2 of this example.

EXAMPLE 9

First coat

A solution as follows:

| | | |
|---|---|---|
| 2,4-dichlorphenol | g | 2.0 |
| 2,4,6-trichlorphenol | g | 3.0 |
| Methanol | ml | 100 |

Seasoned for 90 seconds at 80° C.

Second coat

A solution as follows:

| | | |
|---|---|---|
| Formvar 770 | g | 2.0 |
| Methylene chloride | ml | 100 |
| Ethyl lactate | ml | 3 |

Seasoned for 30 mins. at 90° C.

Third coat

A lacquer of composition as follows:

| | G. |
|---|---|
| Formvar 770 | 16.0 |
| Gasil 64 | 4.0 |
| Toluene | 48 |
| Ethanol | 32 |

Seasoned for 15 mins. at 105° C.

EXAMPLE 10

First coat

A solution as follows:

| | | |
|---|---|---|
| 2,4-dichlorphenol | g | 2.0 |
| 2,4,5-trichlorphenol | g | 3.0 |
| Methanol | ml | 100 |

Seasoned for 90 seconds at 80° C.

Second coat

A solution as follows:

| | | |
|---|---|---|
| Epikote 1001 | g | 1.0 |
| Versamid 100 | g | 1.3 |
| Methylene chloride | ml | 100 |

Seasoned for 15 mins. at 110° C.

Third coat

A lacquer of composition as follows:

| | G. |
|---|---|
| Epikote 1004 | 4.5 |
| Versamid 115 | 4.5 |
| Gasil 64 | 3.6 |
| Trioxide R-CR3 | 0.20 |
| Methylene chloride | 87 |
| Methyl cyclo hexanone | 10 |

Seasoned for 60 mins. at 110° C.

EXAMPLE 11

First coat

A solution as for Example 10.

Second coat

| | | |
|---|---|---|
| Soluble copolyester (Vitel PE200) | g | 1.0 |
| Tetrisopropyl titanate | ml | 0.10 |
| Methyl chloride | ml | 100 |

Seasoned for 15 mins. at 105° C.

Third coat

| | | |
|---|---|---|
| Cellulose nitrate | g | 2.0 |
| Tetraiso-propyl titanate | ml | 0.1 |
| Methanol | ml | 100 |
| Ethyl lactate | ml | 3 |

Seasoned for 30 mins. at 100° C.

Fourth coat

A lacquer composition as for Example 1.

EXAMPLE 12

First coat

A solution as for Example 10.

Second coat

A copolymer containing:

| | | |
|---|---|---|
| 70 mole percent vinyl monochloracetate, 29 mole percent vinyl alcohol, 1 mole percent vinyl acetate | g | 1.0 |
| Acetone | ml | 100 |

Seasoned for 1 minute at 80° C.

Third coat

A lacquer of composition as follows:

| | G. |
|---|---|
| Formvar 1595E | 6.4 |
| Aerosil TK800 | 1.1 |
| Gasil 64 | 1.2 |
| Tioxide RCR3 | 0.12 |
| Trichlorethylene | 73.4 |
| n-Butanol | 10.1 |
| Ethyl lactate | 7.9 |

Seasoned for 15 minutes at 105° C.

EXAMPLE 13

First coat

A solution as for Example 10.

Second coat

A solution as follows:

| | | |
|---|---|---|
| Cellulose acetate butyrate (37% butyryl) | g | 1.0 |
| Acetate | ml | 10 |
| Ethyl lactate | ml | 3 |

Seasoned for 1 minute at 105° C.

Third coat

A lacquer composition as used in Example 8.

EXAMPLE 14

First coat

A solution as follows:

| | | |
|---|---|---|
| 2,4-dichlorphenol | g | 2.5 |
| 2,4,6-trichlorphenol | g | 2.5 |
| VAGH | g | 0.5 |
| Acetone | ml | 100 |

Seasoned for 5 minutes at 105° C.

Second coat

A lacquire composition as used in Example 12.

EXAMPLE 15

First coat

A solution as follows:

| | | |
|---|---|---|
| 2,4-dichlorphenol | g | 5.0 |
| 2,4,6-trichlorphenol | g | 5.0 |
| Saran F220 | g | 2.0 |
| Acetone | ml | 100 |

Seasoned for 5 minutes at 105° C.

Second coat

A lacquer composition as used in Example 8.

EXAMPLE 16

First coat

A solution as follows:

| | G. |
|---|---|
| 2,4-dichlorphenol | 2.5 |
| 2,4,6-trichlorphenol | 2.5 |
| R5468/1 novolak | 0.5 |

Seasoned for 5 minutes at 105° C.

9

Second coat

A lacquer composition as in Example 12.

EXAMPLE 17

First coat

A solution as follows:

| | | |
|---|---|---|
| 4-chloro-3-methyl phenol | g | 2.5 |
| Methanol | ml | 100 |

Dried at 60° C. for 2 minutes.

Second coat

| | | |
|---|---|---|
| VAGH | g | 1.0 |
| Acetone | ml | 100 |

Dried at 60° C. for 2 minutes.

Third coat

A lacquer composition as in Example 12.

EXAMPLE 18

First coat

A solution as follows:

| | | |
|---|---|---|
| 5-chloro-2-hydroxy diphenyl | g | 0.5 |
| 70 mol percent vinyl monochloroacetate, 29 mole 29 mole percent vinyl alcohol, 1 mole percent vinyl acetate | g | 1.0 |
| Acetone | ml | 100 |

Dried at 100° C. for 1 minute.

Second coat

A lacquer composition as in Example 12.

In all cases the coatings adhered strongly to the film base, and when more than one coating was applied these adhered strongly to one another and there was no tendency for the subsequently applied coatings to loosen the first applied coating from the polyester base. In respect of the adhesion of the coatings and drafting characteristics, the drafting film products produced in the foregoing examples were much superior to those produced using similar applications of coatings to untreated polyester film base.

It will be understood that the invention includes coated film base as hereinbefore defined, such coated film base having an additional coating thereon of a photographic silver halide emulsion or light sensitive diazo composition and the method described for the production of such products.

We claim as our invention:

1. A process for the production of a translucent polyester film material which is receptive to clear and legible marking with pencil and ink, which comprises treating a film synthetic linear polyester material on at least one surface with a 0.5 to 20% by weight solution in a volatile medium of at least one halogen-containing phenolic substance selected from the class consisting of chlorinated and brominated monohydric phenols, chlorinated and brominated monohydric phenols which include a methyl substituent, chlorinated and brominated monohydric phenols which include a carboxylic substituent, and chlorinated and brominated naphthalenes, diphenyl and diphenylalkanes which carry at least one hydroxy substituent, heating for 1 to 15 minutes at 30–120° C., and superimposing on the treated surface at least one adherent layer of hydrophobic organic film-forming material, the outermost layer containing finely divided discrete particles of a translucence-producing toothing agent.

2. A process according to claim 1 wherein the halogen containing phenolic substance is selected from the group consisting of ortho-chlorophenol; parachlorophenol; 2,4-dichlorophenol, 2,4,5-trichlorophenol, 2,4,6-trichlorophenol, 2,3,4,6-tetrachlorophenol; pentachlorophenol; 2,4-dichloro-5-methyl-phenol; 2,4-dichloro-3,5-dimethyl-phenol; 4-chloro-2-phenyl-phenol; 2-benzyl-4-chloro-phenol; 2,2'-dichloro 4,4'-diphenyl; 2,2'-methylene bis (4-chlorophenol) 4-chloro-1-naphthol; 3,5-dichlorosalicyclic acid; 2,4-dibromo-phenol; 2,4,6-tribromo-phenol; isopropylene di (2,5-dichlorophenol); o-bromophenol; m-chlorophenol; 4-chloro-3-methyl phenol; 5-chloro-3,6-dimethyl phenol; 2, 4-dichloro-3-methyl-phenol; 5-chloro-2-hydroxy diphenyl and 6,7-dichloro-1-naphthol.

3. A process according to claim 1 wherein the halogen-containing phenolic substance is 4-chloro-3-methyl phenol.

4. A process according to claim 1 wherein the polyester film base is a film of polyethylene terephthalate.

5. A process according to claim 1 wherein the hydrophobic film-forming material is selected from the class consisting of cellulose esters and ethers, acrylic polymers and copolymers, urea formaldehyde resins and modified urea formaldehyde resins, melamine formaldehyde resins and modified melamine formaldehyde resins, alkyd resins, polyvinyl acetals, curable epoxy resins, soluble polyamide resins, and polyester resins.

6. A process according to claim 1 wherein the toothing agent is silica of particle size 0.1 to 15 microns.

7. A process according to claim 1 wherein an intermediate layer is applied to the film to lie between the film and the translucence-producing layer, said intermediate layer consisting essentially of a hydrophobic organic film-forming material.

8. A process according to claim 7 wherein the said intermediate layer is deposited on the film from a solution containing at least one said halogen-containing phenolic substance.

9. A process according to claim 1 wherein the halogen-containing phenolic substance is 4-chloro-3-methyl phenol and wherein the outermost layer consists essentially of a polymer selected from the class consisting of cellulose esters and polyvinyl acetal resins, together with a toothing agent, and there is provided between the film and said outer layer, an intermediate layer consisting essentially of a material selected from the class consisting of vinylidene chloride-acrylonitrile copolymer, vinyl chloride-vinyl acetate copolymer, cellulose acetate-butyrate and phenol formaldehyde resin.

10. A process according to claim 9 wherein the said intermediate layer is deposited on the film from a solution containing at least one said halogen-containing phenolic substance.

References Cited

UNITED STATES PATENTS

| | | | |
|---|---|---|---|
| 2,779,684 | 1/1957 | Alles | 117—7 |
| 2,943,937 | 7/1960 | Nadeau et al. | |
| 2,999,016 | 9/1961 | Beeber et al. | 96—87 XR |
| 3,022,192 | 2/1962 | Brandt. | |
| 3,201,251 | 8/1965 | Nadeau et al. | 96—87 |
| 3,370,951 | 2/1968 | Hasenauer et al. | 96—87 |

DAVID KLEIN, Primary Examiner

U.S. Cl. X.R.

96—87